United States Patent [19]

Gonder

[11] Patent Number: 5,069,540
[45] Date of Patent: Dec. 3, 1991

[54] PARABOLIC SOLAR COLLECTOR BODY AND METHOD

[76] Inventor: Warren W. Gonder, 298 Space View Dr., Colonial Valley, Grants Pass, Oreg. 97526

[21] Appl. No.: 599,446

[22] Filed: Oct. 18, 1990

[51] Int. Cl.$^5$ ............................................. G02B 5/10
[52] U.S. Cl. ............................. 350/631; 359/867; 359/869; 359/883; 359/871; 156/245; 126/438; 126/442
[58] Field of Search ............... 350/614, 628, 629, 641, 350/; 156/245; 126/438, 442

[56] References Cited

U.S. PATENT DOCUMENTS

| | | |
|---|---|---|
| 1,683,266 | 9/1928 | Shipman . |
| 3,070,703 | 12/1962 | Podolny . |
| 3,264,392 | 8/1966 | Taplin . |
| 3,607,584 | 9/1971 | Becht ............................ 350/641 |
| 3,654,012 | 4/1972 | Schlager . |
| 3,655,472 | 4/1972 | Chandler . |
| 3,855,027 | 12/1974 | Erdmann et al. . |
| 4,032,089 | 6/1977 | Kinzler et al. . |
| 4,115,177 | 9/1978 | Nelson . |
| 4,135,493 | 1/1979 | Kennedy ......................... 350/628 |
| 4,149,523 | 4/1979 | Boy-Marcotte et al. . |
| 4,188,358 | 2/1980 | Withoos et al. . |
| 4,235,951 | 11/1980 | Swarovski . |
| 4,238,265 | 12/1980 | Deminet ........................ 350/641 |
| 4,268,332 | 5/1981 | Winders . |
| 4,325,360 | 4/1982 | Kelley . |
| 4,326,773 | 4/1982 | Colas ............................ 350/614 |
| 4,423,343 | 2/1984 | Riise et al. ..................... 126/438 |
| 4,508,425 | 2/1985 | Tanaka et al. .................. 350/641 |
| 4,571,812 | 2/1986 | Gee . |
| 4,587,952 | 5/1986 | Richardson . |
| 4,597,377 | 7/1986 | Melamed . |
| 4,602,853 | 7/1986 | Barr . |
| 4,667,653 | 5/1987 | Cornell . |
| 4,702,227 | 10/1987 | McElwain . |

Primary Examiner—Bruce Y. Arnold
Assistant Examiner—J. P. Ryan
Attorney, Agent, or Firm—Kolisch, Hartwell, Dickinson, McCormack & Heuser

[57] ABSTRACT

A solar collector structure and method of fabrication are disclosed, the solar collector being of the linear, parabolic reflector-type. The parabolic reflector body includes an elongated layered structure having a concave parabolic reflective surface. The reflector body is supported and reinforced by a longitudinal beam member bonded to the convex backside of the layered structure. The layered structure includes a first reflective layer and a supporting molded layer formed of an amorphous hard-curing adherent material such as concrete or stucco. The entire reflector body structure is fabricated on an elongated convex mold. The method of fabrication includes forming the mold using a screed-moving apparatus which moves longitudinally along the mold. As the parabolic reflector body is formed on the mold, the screed-moving apparatus is again used to shape portions of the reflector body. A means for fabricating a parabolic reflector body, including both the elongated mold and the molded and reflective portions of the reflector body, together with the reinforcing longitudinal beam member, is also disclosed.

18 Claims, 4 Drawing Sheets

PARABOLIC SOLAR COLLECTOR BODY AND METHOD

BACKGROUND AND SUMMARY OF THE INVENTION

The Invention relates generally to parabolic reflector-type solar collectors which concentrate solar energy along a focal line, and in particular to a parabolic reflector body construction suitable for in situ, large-scale fabrication, together with a method for making the same.

Elongated, parabolic solar collectors employ a concave trough-like reflective surface having a parabolic shape to focus the sun's energy onto a focal line. Such collectors harness solar energy by positioning an absorber pipe or similar energy transfer device along the focal line of the parabolic reflector. Concentrated solar energy heats the water or other transfer medium in the absorber pipe, which is then transferred to a generator or similar device to perform useful work.

Linear parabolic collectors are rotationally mounted and pivoted mechanically to follow the diurnal movements of the sun. Installations of linear parabolic collectors date back to the early part of this century. One example is the solar-powered pumping station built by Mr. Frank Shuman in Meadi, Egypt, in 1913. Today, large-scale linear parabolic collectors could provide an economically viable alternative to conventional power generation systems, if large-scale reflector structures with sufficient structural integrity and stability can be constructed at a cost low enough to justify the required financial investment. Roughly two-thirds of the cost of harnessing solar energy by means of parabolic solar collectors is the construction of the large numbers of collectors required. The cost of each collector structure must be reduced if a favorable cost-to-benefit ratio is to be achieved for solar energy. The twin goals of reducing cost and increasing benefits for a solar collector installation will need to be met before solar energy becomes an economically important energy resource.

Designing and building solar power stations for generating electricity is a complex problem requiring large-scale, efficient collectors at locations which receive maximum sunlight. Two alternatives for providing collectors at high-sunlight locations are (1) to construct collectors at the site, typically a remote location without fabrication facilities, or (2) to construct the collectors elsewhere and transport them to the site. The required size of linear parabolic solar collectors make their transport impractical.

Fabricating large-scale linear parabolic collectors out of steel framing is not only time consuming and expensive but also subject to introduction of optical distortion due to fabrication stresses. Maximum collector efficiency requires exceptionally accurate parabolic reflective surface, which in turn requires high-tolerance construction techniques. Structures supporting a parabolic reflector-type collector must be both well designed and accurately assembled to produce and maintain its parabolic shape under thermal conditions which vary widely throughout its useful life. Weather conditions, temperature extremes and corrosion represent a constant challenge to the integrity of any exposed, steel-frame structure. Assembly of a frame-type collector at the site of a power station requires transport of a large volume of material to the site and accurate assembly under sometimes harsh conditions.

It would be advantageous to be able to fabricate highly accurate, free-standing parabolic collectors in remote locations without the need to transport all structural materials to the site. It would also be advantageous to provide linear parabolic collectors which possess a high degree of internal strength and structural integrity to resist changes in shape under various thermal conditions and adverse weather conditions. It would be particularly advantageous to provide parabolic solar collectors which can be fabricated economically enough to compete, on a per Kilowatt-Hour (kWH) basis, with conventional thermal energy sources such as fossil fuels and nuclear power.

It is an object of the present invention to provide a parabolic reflector body of the type which concentrates solar energy along a focal line, for use in linear parabolic collectors, and which can be fabricated on an elongated convex parabolic mold near where the solar collector is to be permanently installed.

It is another object of the invention to provide a method of fabricating parabolic solar collectors of the type which concentrate solar energy along a focal line. The method includes forming an elongated mold having a convex top surface with a parabolic cross-section and then forming an elongated layered structure and associated support structures on the mold.

Accordingly, the invention provides a parabolic reflector body fabricated on an elongated, convex parabolic mold, the reflector body being of the type which concentrates solar energy along a focal line. The parabolic reflector body comprises an elongated layered structure having a parabolic concave first side, a convex second side opposite the first side, and generally parallel longitudinal edges. The layers of the structure include a reflective layer on the concave first side which contacts and is conformed to the mold during fabrication, and a support layer bonded to the first layer on the convex second side. The support layer is predominately formed of an amorphous hard-curing adherent material applied over the reflective layer in a moldable state and conformed generally to the convex shape of the mold. In addition, the reflector body includes a beam member bonded to the layered structure on the second side thereof, extending longitudinally parallel to the side edges of the layered structure. In its preferred form, the reflector body includes a tubular beam member which is embedded into a ridge of amorphous hard-curing adherent material applied on the support layer. Additional structural members are provided, extending generally between the beam member and the layered structure, to further support the reflector body.

The invention further provides a means for fabricating a parabolic reflector body, the means being an intermediate construction formed during the process of fabricating the completed reflector body. The means for fabricating comprises the mold on which the layered structure of the reflector body is fabricated, together with the layered structure itself. The mold of the present invention is an elongated mold having a convex top surface with a parabolic cross-section. The elongated reflector body fabricated on the mold, which body is detachable therefrom after fabrication, includes a layered structure having a concave parabolic first side, a convex second side and generally parallel longitudinal edges. The layers of the body include a reflective layer on the concave first side in contact with and conforming to the mold, and support layer, bonded to the reflective layer. The support layer is predominately formed of an amorphous, hard-curing adherent material applied over the reflective layer in a moldable state and shaped to generally conform to the mold. In its preferred form, the means for fabricating a parabolic reflector body includes a beam member extending longitudinally along the support side of the layered structure, generally parallel to and centrally disposed between the longitudinal edges. A central ridge of amorphous, hard-curing adherent material in a moldable state is preferably centrally disposed on the support layer, together with similar parallel edge ridges extending longitudinally adjacent the edges of the layered structure. The beam member is partially embedded in the central ridge. Additional structural members are partially embedded in the edge ridges and are preferably also embedded in mortar extending along the beam member.

The invention further provides a method of fabricating a parabolic reflector body of the type which concentrates solar energy along a focal line. The method comprises steps which include forming an elongated mold having a convex top surface with a parabolic cross-section. Steps in forming the elongated mold include providing a hard-curable moldable material on a base surface, such as the ground. A screed is then guided over the moldable material by means of a screed-moving apparatus. The screed has a parabolic shape and is moved longitudinally along the base surface supporting the mold. After the screed has shaped the mold, the moldable material is allowed to cure.

Following formation of the mold, an elongated layered structure is formed on the mold by steps including: applying a reflective layer of material having a reflective surface on the top of the mold with the reflective surface facing down; positioning a lattice of reinforcing members over the reflective layer; and forming a support layer on the reflective layer. The support layer is formed by steps including applying an amorphous, hard-curing adherent material in a moldable state onto the reflective layer to a depth which covers the reinforcing members. The support layer is then shaped by guiding a screed over the amorphous, hard-curing adherent material by means of the screed-moving apparatus used to form the mold, whereby the reflective and support layers together form the layered structure of the reflector body.

In its preferred form, the method further includes bonding a beam member longitudinally to the support layer of the layered structure, after the shaping of the support layer. Additional preferred steps include forming a central ridge of amorphous, hard-curing adherent material on the support layer centrally on the second side of the layered structure and forming two additional parallel ridges adjacent the edges of the layered structure. The beam member is then embedded into the central ridge of amorphous hard-curing adherent material and additional structural members are partially embedded in the edge ridges and similarly embedded in mortar extending along the beam member. After curing, the reflector body is an integral, self-supporting unit with a highly accurate parabolic, concave front surface.

DETAILED DESCRIPTION OF THE PREFERRED EMBODIMENT

Figure 1:
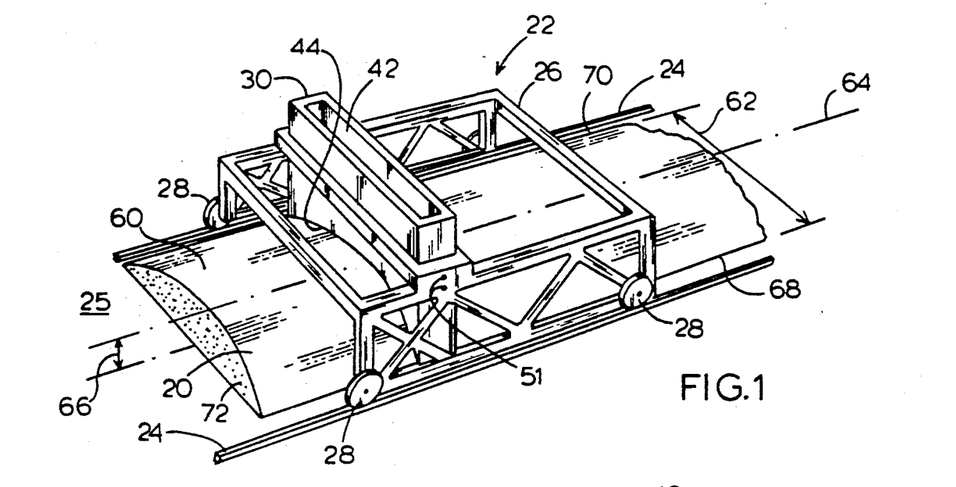
FIG. 1 is a partial perspective view of the mold-forming apparatus used with the method of the present invention for forming a parabolic reflector body in accordance with the present invention.

Referring to FIG. 1, parabolic reflector bodies according to the present invention are fabricated on an elongated, convex parabolic mold 20. The mold is created by a mold-forming apparatus 22 employed at o near the site where a solar energy power station is to be constructed. The mold-forming apparatus includes a pair of guide rails 24 positioned along a base surface 25 on which the mold is to be formed. Base surface 25 will, in most installations, be the ground, suitably graded to provide a relatively firm, level surface on which mold 20 and apparatus 22 are supported (base surface 25 is the support surface on which the structures shown in FIGS. 1, 3-9 and 11 rest). The mold-forming apparatus 22 includes a movable frame 26, supported on wheels 28, which ride on and move along rails 24.

Figure 2:
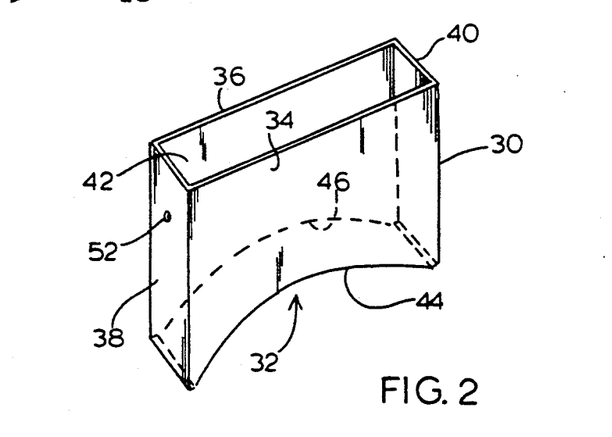
FIG. 2 is a perspective view, on an enlarged scale, of a parabolic-shaped screed for use with the mold-forming apparatus of FIG. 1.

Referring to FIGS. 1 and 2, the movable frame 26 of mold-forming apparatus 22 carries a grading tool 30, which is box-shaped, having parallel side walls 34, 36 joined to parallel end walls 38, 40 to surround and enclose a central rectangular channel 42. The lower edges 44, 46 of side walls 34, 36, respectively, each have a parabolic arcuate shape which, when drawn laterally across a moldable substance, serves as a screed to grade and form the moldable material into a parabolic shape. Parabolic edges 44, 46 are formed by a machining tool which forms an accurate curvature in accordance with coordinates established by the equation of the parabola, as is well known in the art. The shape of the parabola, which establishes the parabolic shape of the completed reflector body, is selected by the designer to position the focus of the parabolic reflector at whatever distance is preferred for the final solar collector installation. The parabolic lower edges 44, 46 of side walls 34, 36 serve as a shaping device for shaping moldable material when moved at right angles across the moldable material. Grading tool 30, shown in FIG. 1 on and surrounded by movable frame 26, and also shown in FIG. 2 (turned 90° from FIG. 1), is hereinafter referred to as screed 30.

Movable frame 26, includes means for supporting screed 30 between rails 24, above base surface 25. Pins, bolts or other fastening means extend through selected openings 51 in frame 26 and through cooperating openings 52 in end walls 38, 40 of screed 30, to releasably attach the screed to the frame. A plurality of openings 51 are provided in frame 26 to allow the screed to be positioned at selected heights above base surface 25. In that way, parabolic edges 44, 46 of the screed can be repositioned to form moldable material into a parabolic shape at different heights above base 25.

The first step in the method of fabricating a parabolic reflector body in accordance with the present invention is to form an elongated mold having a convex top surface with a parabolic cross-section. That step is accomplished by, first, providing a hard-curable, moldable material on base surface 25. The moldable material used to make mold 20 is preferably concrete, stucco or mortar, referred to hereinafter as concrete. The concrete is laid down on base surface 25 by introducing it through central opening 42 of screed 30. In an installation for fabricating parabolic reflectors on a relatively large scale, as presently envisioned, rails 24 of mold-forming apparatus 22 are approximately 12-22 feet apart and movable frame 26 is approximately 6 feet high. To introduce concrete into screed central opening 42, in such a large-scale installation, a concrete mixing truck (not shown) or the like will drive alongside apparatus 22 and direct freshly mixed concrete into opening 42 via suitable pumps and conduits. The concrete will flow out through the open bottom 32 of screed 30, adjacent parabolic edges 44, 46. Movable frame 26 is simultaneously moved along rails 24, spreading the fresh concrete supplied through opening 42 over base surface 25.

As soon as a sufficient quantity of concrete has built up on base surface 25, the top of the concrete begins to be shaped by parabolic edges 44, 46 of screed 30. As frame 26 moves along rails 24, the second step in the forming of mold 20 is accomplished, namely, guiding a screed having a parabolic shape over the concrete to form the concrete into a convex, elongated parabolic mold. The step of guiding the screed over the concrete is accomplished by means of movable frame 26, which serves as a screed-moving apparatus movable longitudinally along base surface 25. Depending on the composition of the concrete, the rate at which concrete is introduced in opening 42, and the speed at which screed 30 is moved over the mold, one or more passes of screed 30 over mold 20 may be required to complete the shaping of the mold.

Referring to FIG. 1, the rails 24 of mold-forming apparatus 22 can be of any desired length. Thus, the apparatus is capable of forming a mold of any useful length. A typical width 62 for mold 20 would be 16 feet. In most applications, rails 24 will be up to several hundred feet long and the apparatus 22 will be used to form one continuous mold structure of the same length. Alternatively, a plurality of consecutive molds, each approximately 35 feet long and 16 feet wide could be formed. The thickness 66 of each mold along the center line of the mold, referred to as longitudinal axis 64, is approximately 12-16 inches, with the thickness tapering down to zero along the parallel longitudinal side edges 68, 70 of the mold. Central longitudinal axis 64 and side edges 68, 70 are mutually parallel to one another. An apparatus 22 used to create a plurality of 35-foot long mold segments, will form the molds on base surface 25 co-linearly, all the molds extending lengthwise along longitudinal axis 64.

In forming individual molds, the ends of each mold segment, depicted as flat end 72 in FIG. 1, are formed by placing substantially vertical forms, made of wood or the like, on base surface 25, as will be readily understood by those skilled in the art. The forms (not shown) will confine the moldable material (i.e., concrete) until the material has cured and hardened, after which the forms will be removed.

Figure 3:
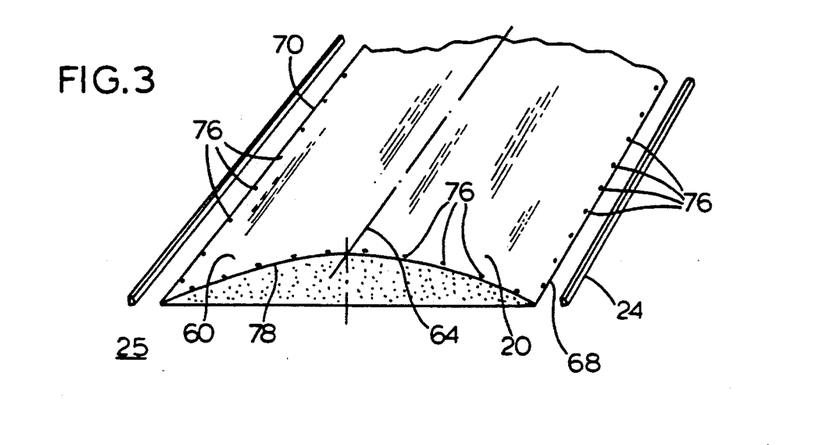
FIG. 3 is a partial perspective view of a mold used in the means and method of the present invention, the mold being fabricated with the apparatus shown in FIG. 1.

Referring to FIG. 3, a completed mold 20, in the form of an elongated, convex parabolic body, rests on base surface 25. A plurality of retainer openings 76, such as pin-receiving sockets or the like, are embedded into mold 20 around its periphery prior to curing, for attachment of reinforcing members in later steps of the fabrication process. Retainer sockets 76 are embedded into the concrete of mold 20 to be flush with the mold surface. Retainer sockets 76 can receive hooks, eyelets or other suitable devices for retaining reinforcing wire or the like. FIG. 3 illustrates retainer sockets 76 at spaced intervals along the parallel side edges 68, 70 of mold 20 and over the end crown of the mold, adjacent end 78 of top surface 60. Similar retainer sockets are provided at the opposite end (not shown) of mold 20 in the same manner as along edge 78.

To complete mold 20, top surface 60 will preferably be smoothed and otherwise finished to form a hard, relatively smooth parabolic surface on which a parabolic reflector body is formed in accordance with the present invention. Rails 24 remain as part of the screed-moving apparatus of the invention, which includes frame 26, wheels 28 and rails 24, and which is used later in the fabrication method to shape portions of the reflector body.

Figures 4, 5, 6, 7:
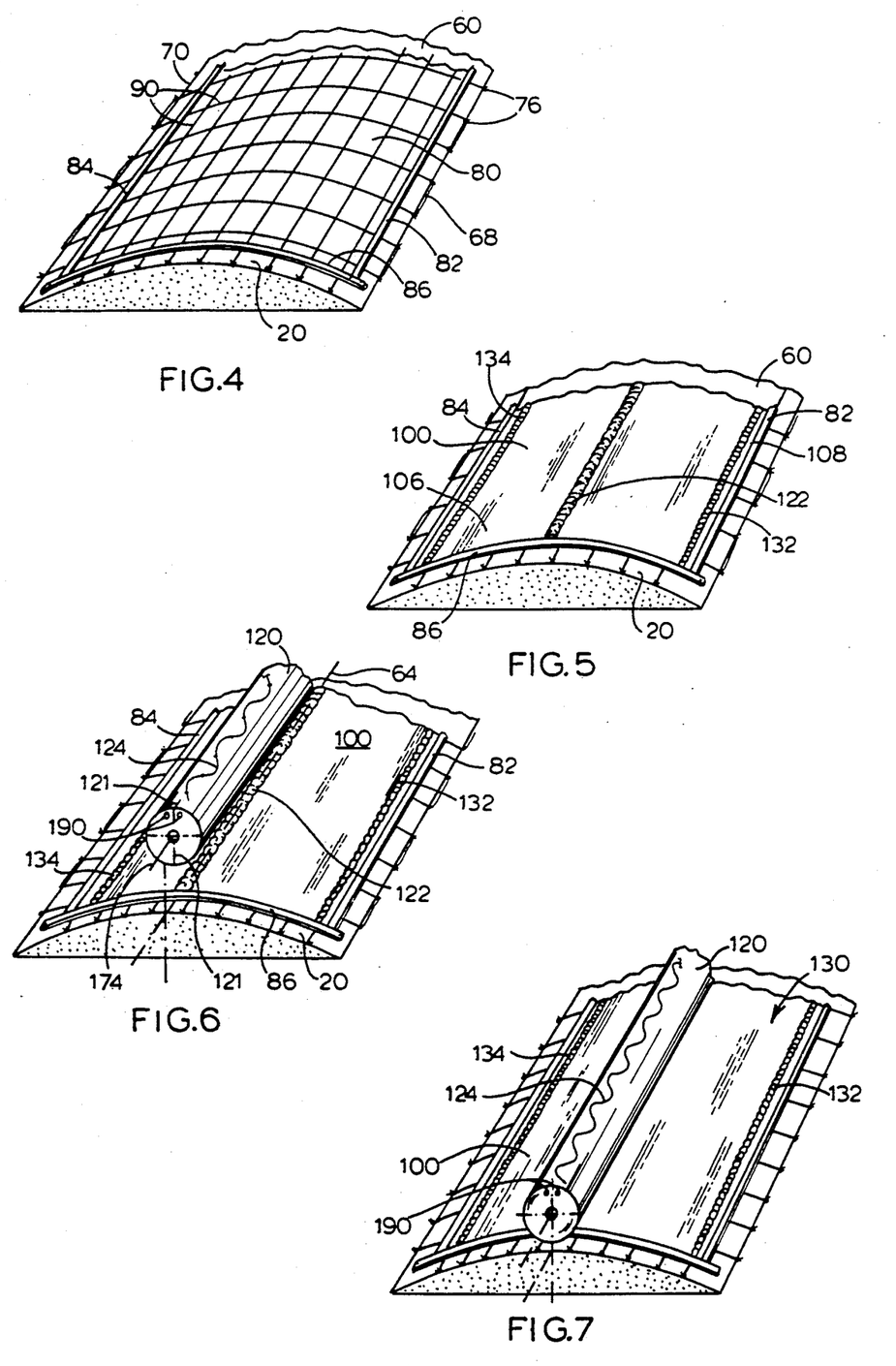
FIG. 4 is a partial perspective view as in FIG. 3 showing the mold with the reflective layer of the parabolic reflector body in place on the mold and reinforcing members positioned over the mold.
FIG. 5 is a partial perspective view as in FIG. 3 with the support layer, formed of amorphous hard-curing adherent material, in place on the mold together with adherent strips formed on the support layer.
FIG. 6 is a partial perspective view as in FIG. 3 with the layered structure of the parabolic reflector body partially formed thereon, further illustrating a beam member just prior to being partially embedded in the layered structure of the reflector body.
FIG. 7 is a partial perspective view as in FIG. 6 with the beam member bonded to the layered structure of the reflector body.

The next step is to form an elongated layered structure on mold 20, as part of the parabolic reflector of the present invention. To form the elongated layered structure, a layer 80 of reflective material is first applied to the top surface 60 of mold 20, with the reflective surface facing down. Referring to FIG. 4, reflective layer 80, also referred to as first layer 80, is shown in position on the top 60 of mold 20. Reflective layer 80 can be any type of reflective material, including silvered glass, anodized aluminum, galvanized sheet metal, glass-glazed silvered steel, aluminized or silvered plastic, or various ceramic materials onto which a reflective surface can be added. The non-reflective, convex backside of layer 80 is selected or coated to bond to mortar.

The material forming reflective layer 80 will preferably be a thin, flat material which bends to conform to the parabolic shape of mold top surface 60, or is premade with a parabolic shape which conforms to the shape of top surface 60. The latter type of pre-formed material could include heavy glass sheeting and ceramics, but such material is very expensive and relatively delicate to transport to remote locations and therefore is not favored for use as the reflective layer. Anodized aluminum or plated and glazed steel sheet material is considerably less expensive and easier to manufacture and handle, although such materials have slightly lower reflectivity. The selection of the reflective material used in layer 80 must be based on a cost-benefits analysis, at least in commercial installations. The exact formulation of layer 80 is matter of design choice and the several alternatives discussed above, as well as others, could be used within the scope of the present invention.

Assuming metal, thin glass or another bendable material is used for reflective layer 80, the material will be draped over mold 20 and confined to the parabolic shape of upper mold surface 60 by reinforcing wires 90 or equivalent means. The reflective surface is oriented to face downwardly toward mold 20. It may be desirable to protect the reflective surface of the reflective layer from scratches, due to direct contact with mold 20, by interposing a protective sheet of paper or a similar disposable material between first layer 80 and the mold. Such a protective sheet of material could be specified for inclusion by the manufacturer of the reflective layer at minimal additional cost.

After reflective layer 80 has been laid down on mold 20, reinforcing members 90 are installed over the reflective layer to reinforce the next layer laid down. Reinforcing members 90 are preferably steel wire, approximately 0.03 inches in diameter, spaced at 2-inch or greater intervals, or at the intervals between retainer sockets 76. Reinforcing members 90 are anchored to mold 20 by means of hooks, eyelets or other suitable devices inserted into retainer sockets 76 on the periphery of the mold. FIG. 4 illustrates reinforcing members 90 in a rectilinear, cross-hatched pattern. For rapid, efficient installation, reinforcing members 90 are laid directly against the convex upper or back surface of layer 80. As an alternative to using wire for reinforcing members 90, a suitable pre-formed reinforcing mesh or lattice, similarly anchored to retainers 76, can be used for the reinforcing material. Such a reinforcing mesh, formed of wire or the like, would be laid directly onto the back convex surface of the reflective layer and secured to retainers 76.

After the reinforcing members have been placed over reflective layer 80, the mold is prepared to receive a second layer, referred to as support layer 100, composed of amorphous, hard-curing adherent material. The support layer is applied over the reflective layer while the amorphous, hard-curing adherent material is in a moldable state, and is subsequently shaped to its final configuration. FIG. 4 illustrates how mold 20 is prepared to receive the support layer. Barrier strips 82, 84 are installed along the side edges of reflective layer 80 to serve as forms confining the support layer until it cures. Barrier strips 82, 84 are joined at their respective ends to barrier strips 86, and a corresponding barrier strip at the distal end of mold 20 (not shown), along the distal end of reflective layer 80. Barrier strips 82, 84, 86 are preferably laid down over reinforcing members 90. Together, barrier strips 82, 84, 86 provide a form into which concrete, mortar, stucco or another amorphous, hard-curing adherent material is caused to flow while in a moldable or flowable state. Hereinafter the amorphous, hard-curing adherent material used to form the support layer will be referred to as stucco.

The next step in forming the elongated reflector body of the present invention is to bond the support layer to reflective layer 80. The support layer is predominantly formed of stucco, applied over the convex backside of layer 80 in a moldable or fluid state and shaped to generally conform to the shape of mold 20, within the confines of barriers 82, 84, 86. The bonding of support layer 100 to reflective layer 80 occurs during the curing process of the stucco. The stucco is applied using the screed-moving apparatus shown in FIG. 1 and described in connection therewith. Apparatus 22 is employed to support screed 30 above mold 20. Parabolic shaping edges 44, 46 are raised a selected distance above the level employed in forming mold 20 by resetting the retaining pins in holes 51 to a different set of holes 51 in frame 26. Screed 30 is raised enough to provide the desired thickness for support layer 100. In a large-scale parabolic mold fabrication installation, producing parabolic reflector bodies of approximately 14 feet in width and 30 feet in length, it is anticipated that support layer 100 will be approximately one inch thick.

Stucco is applied over reflective layer 80 by introducing moldable or wet stucco through opening 42 of screed 30 (see FIGS. 1 and 2) while simultaneously moving the screed longitudinally along mold 20 on rails 24. Use of the screed-moving apparatus 22 of FIG. 1 permits the stucco to be applied over the reflective layer to a depth which covers reinforcing members 90. When sufficient stucco has been applied to raise the support layer to the level of the curved parabolic lower edges of the screed, the moving screed 30 will contact and shape the support layer. In most instances, screed 30 will be guided over the wet stucco of the support layer one or more times in order to shape the support layer to correspond to the shape of parabolic edges 44, 46 of screed 30. An alternative method of applying the stucco would be to spread stucco by hand or another means to a depth slightly exceeding the final depth desired and guiding or drawing screed 30 over the stucco to give it a final shape.

Figure 10:
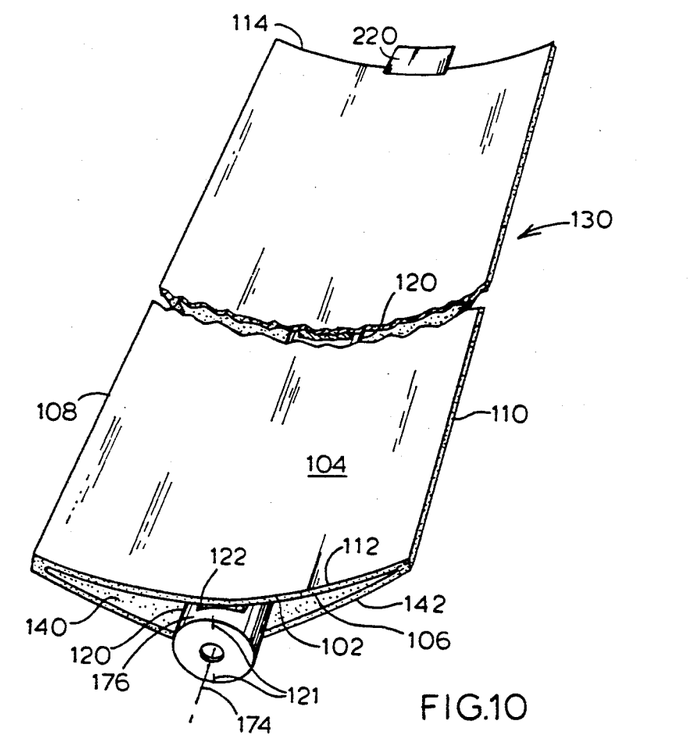
FIG. 10 is a partial perspective view of the parabolic reflector body following its removal from the mold, showing the concave reflective layer facing upwardly.

The formation and shaping of support layer 100 results in an elongated layered structure 102 resting on mold 20. Referring to FIGS. 4, 5 and 10, layered structure 102 includes reflective layer 80 and support layer 100 resting on the convex top surface 60 of mold 20. The elongated layered structure has a concave parabolic first side 104 (see FIG. 10, illustrating layered structure 102, together with the rest of the parabolic reflector body, after removal from mold 20), a convex second side 106, opposite the first side 104, and generally parallel longitudinal edges 108, 110, formed by barrier strips 82, 84. Layered structure 102 also includes a first end 112 formed against barrier 86 and a second end 114 (FIG. 10) at the distal end of the mold.

After support layer 100 has been applied and shaped so that its second side 106 generally conforms in shape to the parabolic top surface 60 of mold 20, a beam member 120 (FIG. 6) is bonded to the support layer. Beam member 120 is positioned centrally on the back or second side 106 of layered structure 102, parallel to central axis 64 of the mold, midway between and parallel to longitudinal edges 108, 110. Beam member 120 is preferably in the form of a steel pipe with closed ends, also referred to as a closed-ended length of tubular steel. The exact position where beam 120 is installed on layered structure 102 is important to the final alignment of the parabolic reflector body. Consequently, beam 120 should be carefully aligned parallel with the central axis of layered structure 102. A convenient means of accurately aligning the beam member is to include index marks 121 on the beam member which can be precisely aligned with the longitudinal axis of 64 of mold 20. Suitable marks (not shown) on mold 20 could be used to assist in assuring precise alignment between the beam member and layered structure 102. Index marks 121 on the beam member are preferably scribed onto the steel surface during manufacture.

Beam 120 is bonded to the layered structure 102 by steps shown in FIGS. 5, 6 and 7. A central ridge 122 of amorphous, hard-curing adherent material is formed on second layer 100, extending longitudinally along the spine or topmost longitudinal line extending along the second convex side of support layer 100. Ridge 122 is preferably formed of the same material as is support layer 100, for example, stucco. Ridge 122 is applied to the surface of support layer 100 by any suitable means while the support layer is wet or uncured, such as by directing a flow of wet stucco onto support layer 100. Beam member 120 is then partially embedded in central ridge 122 while the stucco is in a moldable state, securing the beam member to the two-layered structure 102.

Referring to FIG. 6, tubular beam member 120 is covered in selected regions with an adherence-enhancing covering such as a pattern of reinforcing wire 124 welded or otherwise attached to the beam member. In FIG. 6, reinforcing wire 124 having a sinusoidal pattern is welded to the beam member on one side, and a similar adherent pattern of material is welded to the beam member on the opposite side (not shown) in order to enhance adherence of the beam to the central stucco ridge 122. Without the adherence-enhancing properties of surface 124 welded to the beam member, the beam will not properly adhere to the stucco.

FIG. 7 shows the partially completed parabolic reflector body 130. Beam member 120 is bonded to support layer 100 of elongated layered structure 102 along central stucco ridge 122. Additional side ridges of stucco 132, 134 (see FIGS. 5, 6 and 7) are applied to support layer 100, either simultaneously with the formation of central ridge 122 or after the central ridge has been formed and beam member 120 partially embedded therein. Side ridges 132, 134 are formed of stucco in a moldable state, and applied to support layer 100 while it is still in a moldable state. The side ridges are parallel ridges of amorphous, hard-curing adherent material. The ridges are formed on support layer 100, one on each side of central ridge 122.

Figure 8:
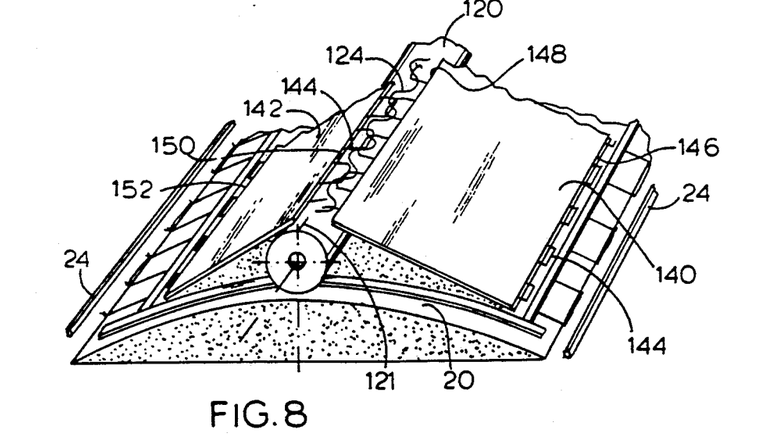
FIG. 8 is a partial perspective view as in FIG. 6 illustrating the layered structure of the parabolic reflector body in place on the mold, together with a plurality of reinforcing members positioned between the beam member and the layered structure.
Figure 8A:
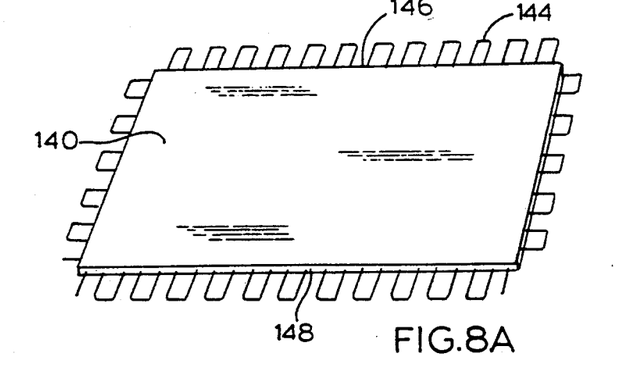
FIG. 8A is a perspective view of one of the reinforcing members used in forming the parabolic reflector body as illustrated in FIG. 8.

To further reinforce the structural integrity of the parabolic reflector body, additional structural members are attached between side ridges 132, 134 (FIG. 7) and beam member 120. Referring to FIG. 8, the additional structural members are preferably in the form of a plurality of concrete slabs, each partially embedded in one or the other of side ridges 132, 134 and extending to beam member 120. Reinforcing slabs 140, 142 are preferably flat, relatively thin slabs of concrete formed at a site near where parabolic reflector bodies of the present invention are fabricated. Formation of reinforcing slabs 140, 142 can be by any conventional means, such as, for example, by providing concrete forms of a suitable depth, having flat bottoms, in which wet concrete is poured. The concrete used for slabs 140, 142 can be the same or similar to that used for forming mold 20, or can be stucco or another equivalent moldable, hard-curing material. FIG. 8A illustrates a representative concrete slab used for reinforcing slabs 140, 142, the representative slab being slab 140.

Figure 9:
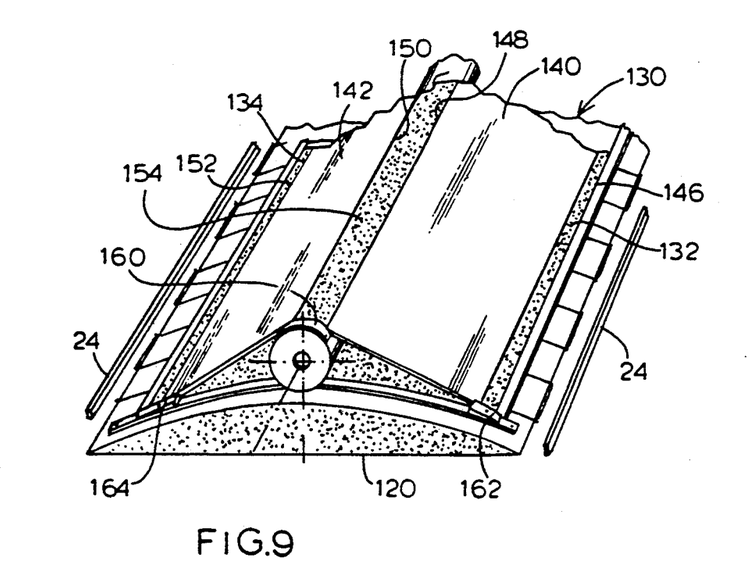
FIG. 9 is a partial perspective view as in FIG. 8 illustrating the means of attachment of the reinforcing members to the beam member and to the layered structure of the reflector body and also showing one preferred form of the means for fabricating a reflector body according to the invention.

Referring to FIGS. 8, 8A and 9, reinforcing wires 144 are embedded in slabs 140, 142 during formation, as is well known in the art. The reinforcing wires 144 protrude beyond the side edges 146, 148 of slab 140. Similarly, reinforcing wires 144 extend beyond the side edges 150, 152 of slab 142 (FIG. 8), to facilitate anchoring the slabs to the reflector body. Each Slab 140, 142 is preferably a unitary, continuous, elongated body extending the full length of the parabolic reflector.

Referring to FIG. 9, in order to bond slabs 140, 142 to the other structural parts of the parabolic reflector under construction, additional stucco is applied along and over slab edges 146, 148, 150, 152. Barriers are installed at locations 160, 162 and 164, adjacent the ends of beam member 120 and side ridges 132 and 134 (FIG. 7), respectively, to confine the additional stucco applied. Barriers similar to 160, 162, 164 are also applied at the distal end of mold 20, as will be readily understood. After installation of barriers 160, 162, 164, slabs 140 and 142 are each bonded along one edge to beam 120 and along the opposite edge to layered structure 102. Slabs 140, 142 are bonded to beam member 120 by an application of stucco 154, which serves as a cementing substance bonding the slabs to beam member 120. Applied stucco 154 surrounds and overlies the reinforcing members 144 protruding from edge 148 of slab 140 and edge 150 of slab 142. The additional stucco also engages the reinforcing wire 124 welded to beam member 120.

Edge 146 of slab 140 is bonded to layered structure 102 by applying additional stucco to edge ridge 132 (see FIG. 7), previously applied. The additional stucco, together with the side ridge 132, partially embeds edge 146 in stucco ridge 132. Similarly, edge 152 of slab 142, and the reinforcing wires 144 protruding therefrom, are partially embedded in stucco ridge 134 by applying an additional layer of stucco over edge 152 and the adjacent reinforcing wires.

After the additional stucco 154, 166 and 168 have been applied, the entire reflector structure is allowed to cure and harden and the reinforcing wires are clipped from the retainers in retainer sockets 76 on mold 20. Once that has occurred, the parabolic reflector body 130 is lifted from mold 20 as a single unit. Referring to FIG. 10, reflector body 130 is shown inverted after removal from mold 20. Elongated layered structure 102 has a concave parabolic first side 104, a convex second side 106 and generally parallel longitudinal edges 108, 110. Beam member 120 is bonded to the convex second side 106 of layered structure 102 by means of central ridge of stucco 122. Reinforcing slabs 140, 142 help support and stabilize the entire structure.

Figure 11:
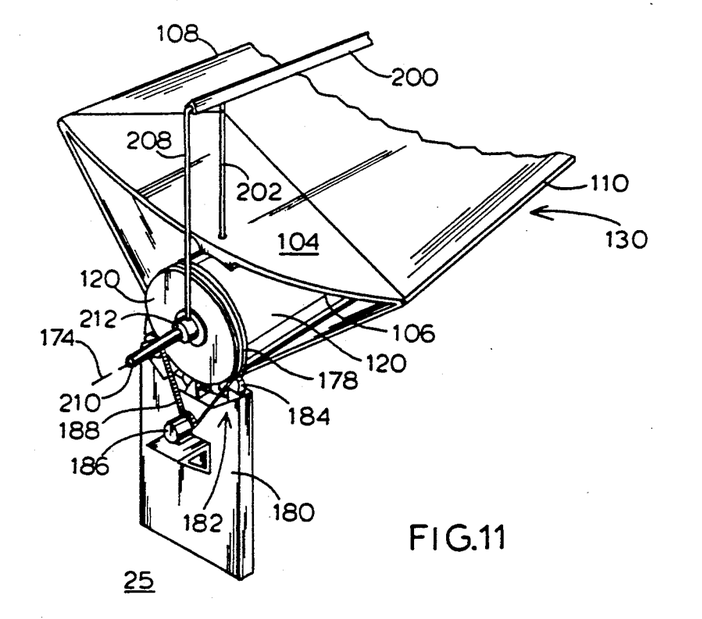
FIG. 11 is a partial perspective view of one end of a parabolic reflector body in accordance with the present invention mounted on a support pedestal for rotational movement.

As shown in FIG. 10, layered structure 102 extends lengthwise between a first end 112 and a second end 114, the latter being referred to herein as the distal end. Beam member 120, is slightly longer than layered structure 102, extending beyond first end 112 and second end 114 (not shown) in order to provide a means for rotatably supporting the parabolic reflector body for rotation about the central axis 174 of the tubular beam member. The end portions of beam member 120—end portion 176 being at first end 112 and a corresponding end portion (not shown) at the distal end of the beam member—include cylindrical support surfaces for supporting the reflector body 130 for rotational movement about axis 174. Referring to FIG. 11, cylindrical support surface 178 is that part of end portion 176 on which the beam member 120 rests when mounted for rotational movement. A corresponding cylindrical support surface is provided on the distal end of beam 120.

FIG. 11 shows a representative means for installing and rotatably supporting parabolic reflector body 130 in a solar collector installation. FIG. 11 shows first end 112 of parabolic reflector body 130. A corresponding support structure will be used at the distal end (not shown) to support second end 114 (see FIG. 10). A support pedestal 180 rests on base surface 25, such as the ground. The pedestal includes rotational mountings 182 for engaging cylindrical support surface 178 of cylindrical beam member 120. Each rotational mounting is in the form of a plurality of rollers 184. A motor 186 and belt or chain 188, coupled to beam member 120, rotates the beam member and attached parabolic reflector structure 130 about the beam member axis 174. Assuming the orientation of the support structure and parabolic reflector is properly aligned with the rotational axis of the earth, the installation shown in FIG. 11 will permit parabolic reflector 130 to effectively follow the diurnal movement of the sun.

It is anticipated that a plurality of individual reflector bodies 130 will be mounted generally co-linearly with one another, for rotation about a single continuous axis 174, which is the axis of the beam member 120. A single electric motor 186 and drive means 188 will thereby be used to rotate a plurality of parabolic reflector bodies 130. Adjacent collector bodies are coupled together by aligning scribed beam member index marks 121 (FIG. 6) and welding adjacent beam members to one another. In that way, the reflector bodies can be assured of coordinated, identical patterns of movement under the control of a single control mechanism.

One of the advantages of using a closed-ended tubular or cylindrical beam member 120 as the major support of reflector body 130 is the storage capacity provided in the interior of the tubular beam member. One practical application for the storage capacity within tubular beam member 120 is the storage of fluids such as hydrogen gas, turbine exhaust condensate, or other useful fluids. In order to access the interior of tubular beam member 120, a passageway for fluid is provided by one or more openings 190 through the closed end of the beam member, as shown in FIG. 6. Openings 190, in conjunction with plumbing extending to a suitable rotary seal, enable fluid to flow into and out of the interior of the beam member. The use of the interior of beam member 120 for gas storage, such as for hydrogen gas, can be part of an energy-storage system which generates hydrogen gas electrically by electrolysis during daylight, peak-production periods, stores the hydrogen gas under pressure within beam 120, and utilizes the hydrogen at night to produce additional power. Such systems can help to make large-scale solar collectors cost effective, continuous energy producers.

A representative system for collecting the solar energy focused along a focal line is illustrated in FIG. 11. An absorber tube 200 is positioned above the concave reflective surface 104 of collector body 130 along the focal line of the parabolic surface. Absorber tube 200 is mounted in any suitable manner, such as by a support strut 202 and wires 204, 206. The absorber tube is coupled to a fluid conduit 208, which transports a heat-absorbing medium carried within absorber tube 200 to a transfer conduit 210 mounted axially along axis 174 of tubular beam member 120. A suitable rotary seal 212, having a fluid-tight rotational seal, couples transfer conduit 208 to conduit 210. Similar absorber tubes 200 will be mounted above each parabolic reflector body 130 in a continuous installation extending along a linear array containing a plurality of reflector bodies. Water or another heat transfer medium is pumped through absorber tube 200 and conduits 208 and 210, transferring heat generated within absorber tube 200 to an external use such as a steam turbine (not shown) for power generation or the like.

Another use of the parabolic reflector bodies of the present invention, particularly on overcast, rainy days when power generation is not possible, is to collect water. Referring to FIG. 10, the parabolic reflector surface 104 has a trough-like shape which ca be an efficient water collector. All that is necessary is to orient the reflector bodies generally horizontally and water falling on the parabolic surface 104 will run to the center. A provision of a slight incline will cause the water to flow to one end of the reflector body, as will be readily understood. In installations with a plurality of reflector bodies arranged co-linearly, a connecting water channel 220 is provided at the lower end of the reflector body to channel water thereon onto the next or adjacent reflector body. The lowest or final collector body in a line of collector bodies will be provided with a suitable collection trough or device for recovering the water which falls on all the collector bodies in the line. Large-scale installations containing up to hundreds or even thousands of collector bodies will be able to collect and recover substantial quantities of water in this manner. The water can be used in the steam generation process or for another purpose.

The invention provides a highly accurate, stable parabolic reflector body useable in solar collector installations. The collector body, when completed, is a virtually unitary and monolithic device which will effectively retain its accurate parabolic shape under extreme variations in the environment. The absence of bolts, rivets, and the like reduces the chance of structural deformation and degradation over time. Fabrication of the parabolic reflector body is accomplished on a mold which is formed at or near the location of the solar collector installation. The same apparatus used to create the mold is subsequently used in the fabrication of the collector body itself. Because it is formed of molded concrete, stucco or mortar, it is fabricated using large quantities of sand, a raw material present in many desert locations where solar installations are constructed. Consequently, a significant portion of the material used to fabricate the collector bodies will be present at or near the solar installation, reducing construction costs and transport costs. Because the collector bodies are fabricated in situ, construction costs are minimized. The invention further provides a means for fabricating parabolic reflector bodies in the form of a mold with a partially-completed collector body thereon. The means for fabricating the collector body employs the efficient fabrication techniques of the invention. The invention further provides an efficient method of forming parabolic reflector bodies at or near the sight of a solar collector power station.

In addition to its advantages as part of a solar collector, the collector bodies of the present invention include storage space useful in power generation, within the tubular beam member on which the collector bodies are supported. Furthermore, the collector body is useable to collect rainfall which, at remote desert locations, is a scarce and valuable commodity.

The present invention provides solar collector bodies which can be fabricated and erected at only one-tenth the cost of prior art collector installations. Because of the importance of the cost-to-benefit ratio in achieving greater commercial use of solar energy, it may be desirable to make minor alterations to further reduce costs. For example, the storage feature of tubular beam member 120 could be eliminated and the beam member perforated to provide an adherent surface, instead of welding reinforcing wire to the beam member, as shown at 124 in FIG. 8. Reinforcing slabs 140, 142 could be exchanged for sheet-metal struts or the like which, in certain circumstances, might prove less expensive. Other cost reduction techniques will occur to those skilled in the art as installations according to the present invention are constructed.

The invention provides a parabolic reflector body for use in linear parabolic collectors which concentrate solar energy along a focal line. The reflector bodies can be fabricated near where the solar power station is to be permanently installed. Each reflector body is fabricated on an elongated convex parabolic mold. The means for fabricating the collector bodies comprises a portion of a collector body in place on the mold from which an integral parabolic collector body, capable of rotational movement to follow the sun, can be efficiently fabricated.

What is claimed is:

1. A parabolic reflector body fabricated on an elongated, convex parabolic mold, the reflector body being of the type which concentrates solar energy along a focal line, comprising:
   an elongated layered structure having a parabolic concave first side, a convex second side opposite said first side and generally parallel longitudinal edges, the layers of said structure including
   a reflective layer on said concave first side which contacts and conforms to the mold during fabrication, and
   a support layer bonded to said reflective layer on said convex second side, said support layer being predominately formed of an amorphous hard-curing adherent material applied over said reflective layer in a moldable state and conformed generally to the convex shape of the mold, and
   a tubular beam member bonded to said support layer by adherence of said beam member to amorphous hard-curing adherent material along a side of said beam member, said beam member extending longitudinally parallel to said edges of said layered structure.

2. A parabolic reflector body as in claim 1 in which said beam member is a steel pipe bonded to said support layer by means of a cementing agent.

3. A parabolic reflector body as in claim 1 in which said layered structure extends lengthwise between first and second ends and said beam member is positioned centrally on said second side of said layered structure approximately midway between said longitudinal edges, said beam member being longer than said layered structure and extending beyond said first and second ends and including cylindrical support surfaces on the portions of said beam member extending beyond said first and second ends whereby the reflector body, when removed from the mold, is supported for rotational movement about the axis of said beam member by said cylindrical support surfaces.

4. A parabolic reflector body as in claim 1 further including a plurality of structural members extending between said beam member and said second side of said layered structure to provide additional structural support to the reflector body.

5. A parabolic reflector as in claim 1 including reinforcing members embedded in the amorphous, hard-curing material of said support layer.

6. A parabolic reflector body fabricated on an elongated, convex parabolic mold, the reflector body being of the type which concentrates solar energy along a focal line, comprising:
   an elongated layered structure having a parabolic concave first side, a convex second side opposite said first side and generally parallel longitudinal edges, the layers of said structure including
   a reflective layer on said concave first side which contacts and conforms to the mold during fabrication, and
   a support layer bonded to said reflective layer on said convex second side, said support layer being predominately formed of an amorphous hard-curing adherent material applied over said reflective layer in a moldable state and conformed generally to the convex shape of the mold, and
   a beam member in the form of a closed-ended length of tubular steel embedded partially into amorphous hard-curing adherent material on said support layer and extending longitudinally parallel to said edges of said layered structure.

7. A parabolic reflector body as in claim 6 in which said beam member is positioned centrally on said second side of said layered structure midway between said longitudinal edges.

8. A parabolic reflector body as in claim 6 in which said beam member includes at least one opening for ingress and egress of fluids from the interior of said closed-ended length of tubular steel, whereby fluid storage is provided within said beam member.

9. A parabolic reflector body fabricated on an elongated, convex parabolic mold, the reflector body being of the type which concentrates solar energy along a focal line, comprising:
   an elongated layered structure having a parabolic concave first side, a convex second side opposite said first side and generally parallel longitudinal edges, the layers of said structure including
   a reflective layer on said concave first side which contacts and conforms to the mold during fabrication, and
   a support layer bonded to said reflective layer on said convex second side, said support layer being predominately formed of an amorphous hard-curing adherent material applied over said reflective layer in a moldable state and conformed generally to the convex shape of the mold,
   a longitudinally-extending ridge of amorphous hard-curing adherent material disposed centrally on the convex second side of said layered structure, and
   a beam member partially embedded in said longitudinally-extending ridge on said support layer, said beam member extending longitudinally parallel to said edges of said layered structure.

10. A parabolic reflector body fabricated on an elongated, convex parabolic mold, the reflector body being of the type which concentrates solar energy along a focal line, comprising:
- an elongated layered structure having a parabolic concave first side, a convex second side opposite said first side and generally parallel longitudinal edges, the layers of said structure including
- a reflective layer on said concave first side which contacts and conforms to the mold during fabrication, and
- a support layer bonded to said reflective layer on said convex second side, said support layer being predominately formed of an amorphous hard-curing adherent material applied over said reflective layer in a moldable state and conformed generally to the convex shape of the mold,
- a beam member bonded to said support layer and extending longitudinally parallel to said edges of said layered structure, and
- a plurality of structural members extending between said beam member and said second side of said layered structure to provide additional structural support to the reflector body, said structural members being concrete slabs each bonded to said beam member adjacent one longitudinal edge thereof and to said layered structure adjacent an opposite edge thereof.

11. A parabolic reflector body as in claim 10 including an additional quantity of said amorphous, hard-curing adherent material on said second side of said layered structure adjacent each said longitudinal edge, said concrete slabs each being bonded to said beam member by a cementing substance and to said layered structure by partially embedding said opposite edge of said slab in the amorphous, hard-curing adherent material adjacent said one longitudinal edge.

12. Means for fabricating a parabolic reflector body, comprising:
- an elongated mold having a convex top surface with a parabolic cross-section,
- an elongated reflector body fabricated on said mold and detachable therefrom after fabrication, said body including a layered structure having a parabolic concave first side, a convex second side and generally parallel longitudinal edges, the layers of said body including,
- a reflective layer on said concave first side in contact with and conforming to said mold,
- a support layer bonded to said reflective layer, and support layer being predominately formed of an amorphous, hard-curing adherent material applied over said reflective layer in a moldable state and shaped to generally conform to the shape of said mold,
- a longitudinally-extending central ridge of said amorphous, hard-curing adherent material centrally disposed on said support layer, and
- a beam member extending longitudinally along said second side of said layered structure embedded in said central ridge.

13. Means as in claim 12 including two parallel edge ridges of said amorphous, hard-curing adherent material on said support layer extending longitudinally adjacent the edges of said layered structure, and including a plurality of structural members attached to said beam member and partially embedded in said edge ridges.

14. Means as in claim 12 in which said support layer is uncured and moldable, including a longitudinally-extending central ridge of said amorphous, hard-curing adherent material in a moldable state centrally disposed on said support layer, a beam member embedded in said central ridge, two parallel edge ridges of said amorphous, hard-curing adherent material in a moldable state on said support layer extending longitudinally adjacent the edges of said layered structure, and including a plurality of structural members attached to said beam member and partially embedded in said edge ridges.

15. A method of fabricating a parabolic reflector body of the type which concentrates solar energy along a focal line, comprising the steps of:
- forming an elongated mold having a convex top surface with a parabolic cross-section by steps including,
- providing a hard-curable, moldable material on a base surface,
- guiding a screed having a parabolic shape over said moldable material by means of a screed-moving apparatus which moves longitudinally along said base surface, and allowing said moldable material to cure, and
- forming an elongated layered structure on the mold by steps including applying a reflective layer of material having a reflective surface on the top of the mold with the reflective surface facing downwardly against the mold,
- positioning a lattice of reinforcing members over the reflective layer,
- forming a support layer on the reflective layer by steps which include applying an amorphous, hard-curing adherent material in a moldable state onto the reflective layer to a depth which covers the reinforcing members, and
- shaping the support layer by guiding a screed over the amorphous, hard-curing adherent material by means of the screed-moving apparatus, whereby said reflective and support layers form the layered structure.

16. A method as in claim 15 including the step of bonding a beam member longitudinally to the support layer following the step of shaping the support layer.

17. A method as in claim 16 in which said step of bonding the beam member includes forming a longitudinally-extending central ridge of amorphous, hard-curing adherent material on the support layer while the support layer and the central ridge are in a moldable state and partially embedding the beam member into the central ridge.

18. A method as in claim 17 including attaching reinforcing members to the support layer by steps including:
- providing a plurality of structural members for attachment between the elongated layered structure and the beam member,
- forming two parallel ridges of amorphous, hard-curing adherent material on the support layer, one on each side of said central ridge, while the support layer and the two ridges are in a moldable state,
- partially embedding at least one of the structural members into each said ridge, and
- bonding a portion of each structural member to the beam member.

* * * * *